United States Patent [19]

Hoepfner et al.

[11] Patent Number: 4,614,080
[45] Date of Patent: Sep. 30, 1986

[54] GRASS COLLECTOR BLOWER

[76] Inventors: Thomas L. Hoepfner, 98 Prairiewood Dr.; Keith A. Leistikow, 88 Prairiewood Dr., both of Fargo, N. Dak. 58103

[21] Appl. No.: 692,657

[22] Filed: Jan. 17, 1985

Related U.S. Application Data

[63] Continuation-in-part of Ser. No. 557,233, Dec. 1, 1983, abandoned.

[51] Int. Cl.⁴ .................. A01D 34/63; A01D 87/10
[52] U.S. Cl. ................................ 56/16.6; 56/13.3
[58] Field of Search ............... 56/13.3, 16.6, 128

[56] References Cited

U.S. PATENT DOCUMENTS

| | | | |
|---|---|---|---|
| 744,393 | 11/1903 | Palmer | 56/292 |
| 2,843,991 | 7/1958 | Poehls | 56/13.3 |
| 2,849,851 | 9/1958 | Hayter | 56/13.4 |
| 2,920,435 | 1/1960 | Vallone | 56/13.3 |
| 3,058,284 | 10/1962 | Anderson | 56/13.3 |
| 3,134,214 | 5/1964 | Shaw | 56/202 |
| 3,367,092 | 2/1968 | Gifford | 56/16.6 |
| 3,657,865 | 4/1972 | Ober | 56/16.6 |
| 3,699,751 | 10/1972 | Ross et al. | 56/11.6 |
| 3,736,736 | 6/1973 | Myers | 56/16.6 |
| 3,778,865 | 12/1973 | Schmidt, Jr. et al. | 56/13.3 |
| 3,783,592 | 1/1974 | Schraut | 56/13.3 |
| 3,812,917 | 5/1974 | Strate | 56/11.6 |
| 3,888,072 | 6/1975 | Templeton | 56/13.4 |
| 3,925,968 | 12/1975 | Wagenhals | 56/13.3 |
| 3,987,606 | 10/1976 | Evans | 56/13.3 |
| 4,043,100 | 8/1977 | Aumann et al. | 56/16.5 |
| 4,081,947 | 4/1978 | Szymanis | 56/13.3 |
| 4,095,398 | 6/1978 | Aumann et al. | 56/16.6 |
| 4,104,852 | 8/1978 | Tackett | 56/16.6 |
| 4,106,272 | 8/1978 | Peterson et al. | 56/16.6 |
| 4,114,353 | 9/1978 | Ansbaugh et al. | 56/13.3 |
| 4,188,160 | 2/1980 | Corbett et al. | 56/13.3 |
| 4,317,325 | 3/1982 | Marto | 56/11.6 |
| 4,345,416 | 8/1982 | Cameron | 56/13.3 |

OTHER PUBLICATIONS

E-Z Rake, Inc. "E-Z VAC 4 Models . . . To Fit Most Tractors and Riders, Oct. 1980.
Grasshopper Company brochure "Your Next Mower".
PeCo Lawn Vacs brochures–John Deere and Dixon ZTR, 1984.

Primary Examiner—Paul J. Hirsch
Attorney, Agent, or Firm—Burd, Bartz & Gutenkauf

[57] ABSTRACT

A rotary lawn mower mounted on a tractor is equipped with a blower operable to move grass clippings from the mower into a pair of collection bags. The blower has an impeller located within an upright housing attached to a side of the mower. A belt and pulley drive connects a horizontal impeller shaft to an upright blade shaft of the mower to rotate the impeller concurrently with the grass cutting blades of the mower. The rotating impeller draws grass clippings and other loose material from the mower and discharges the material into collection bags mounted on the rear of the tractor.

46 Claims, 14 Drawing Figures

GRASS COLLECTOR BLOWER

CROSS REFERENCE TO RELATED APPLICATION

This application is a continuation-in-part of U.S. application Ser. No. 557,233 filed Dec. 1, 1983, now abandoned.

FIELD OF INVENTION

The invention is in the field of material conveying apparatus operable to move particulate material and a fluid from a first location to a second location. The apparatus is specifically directed to a rotary lawn mower for moving grass clippings from the deck of the lawn mower into a collection container.

BACKGROUND OF INVENTION

A conventional tractor mounted rotary lawn mower has a generally horizontal deck supporting one or more rotary blades. The deck has a side discharge chute for discharging the grass clippings from the mower deck. Blowers driven by the PTO of the tractor are used to pick up the grass clippings from the side discharge chute and move them into a collection bag. In some installations, a separate internal combustion engine is used to power the blower to draw grass clippings from the side discharge chute and move the clippings along with air into a collection bag.

The tractor and blower engines generate considerable noise and require individual servicing and repair. In operation, when the tractor engine is stopped, the blower continues to operate until it is turned off.

Rotary lawn mowers have been equipped with blowers driven by the mower engines for moving grass clippings from adjacent the sides of the decks of the lawn mowers into a collection containers. Wagenhals in U.S. Pat. No. 3,925,968 discloses a rotary lawn mower supported by a tractor equipped with a blower for moving grass clippings from the rotary lawn mower into a bag. A combined belt and pulley and gear box drive is used to transmit power from a blade shaft to rotate the fan of the blower. Gear box drives are costly and consume substantial power to rotate the fan.

SUMMARY OF INVENTION

The invention is directed to an apparatus for moving material entrained in a moving fluid from a first location to a desired second position such as a storage container. The apparatus has a cutting unit adapted to cut material into particles that can flow with a stream of air. The cut material is drawn into a blower unit having a rotatable impeller that transports the material along with air to a collection container. The cutting unit includes one or more rotating cutting blades that are driven from a power source, such as an internal combustion engine. Power transmission means operatively couples a shaft for one of the cutting blades and the impeller of the blower whereby the impeller operates concurrently with the rotation of the cutting blades. The power transmission includes a single endless belt drivably connecting the blade shaft with the impeller. An upright post having pulley means directs the belt into operative relation relative to a pulley on the blade shaft and a pulley drivably connected to the impeller. The internal combustion engine for driving the cutting blades concurrently rotates the impeller through the power transmission means so that the material is initially cut by the blades and the cut material is moved into the blower and transported thereby into the collection container.

A preferred form of the apparatus is used for cutting grass and collecting the grass clippings and other loose material into a collector means, such as a bag or container. The apparatus is mounted on a tractor or other vehicles having a power source, such as an internal combustion engine. A rotary lawn mower having a generally horizontal deck is mounted on the tractor. The deck has a grass clippings side discharge section. A plurality of grass cutting blades are rotatably mounted on the deck for cutting grass located below the deck. Blade shafts rotatably mount the blades on the deck. A drive such as a belt and pulley drive is used to transmit power from the engine of the tractor to the blade shafts to rotate the blades whereby the grass under the deck is cut and moved through the discharge opening in the side discharge section of the deck.

A blower means receives the grass clippings from the discharge opening and transport the grass clippings along with air to the collector means. The blower means has a housing with an internal chamber and an inlet opening aligned with the discharge opening of the deck and an outlet opening directed toward the collector means. An upright impeller located within the internal chamber is rotatably mounted on the housing. A horizontal shaft means or impeller shaft rotatably supports the impeller means on the housing for rotation about a transverse generally horizontal axis. Power transmission means drivably connects the horizontal impeller shaft with one upright blade shaft whereby power is transmitted from the drive means for the blades to the impeller to concurrently rotate the impeller with the blades. The deck has a hole above the blade shaft located adjacent the discharge section of the deck. The power transmission means comprises an upright shaft extension extended through the hole and secured to the blade shaft aligned with the hole. A first horizontal pulley is mounted on top of the shaft extension. A second vertical pulley is secured to the shaft means that supports the impeller on the housing. An upright post is mounted on a support secured to the housing. Third and fourth pulleys are rotatably mounted on the post. A single endless belt is trained about the first and second pulleys and engages the third and fourth pulleys rotatably mounted on the post. The post is inclined upwardly and away from the axis of rotation of the impeller shaft to rotatably support the third and fourth pulleys about an inclined axis. This locates the third and fourth pulleys at an angle which facilitates the alignment and running of the belt on the first horizontal and second vertical orientated pulleys. The belt follows a general right angle path and transmits power between normally orientated shafts with a minimum loss of power. This power transmission is single, low cost and efficient. The post is adjustably mounted on its support to allow the operator to adjust the tension of the endless belt.

The blower has an impeller that includes a generally vertical plate and a plurality of generally radial paddles secured to one side of the plate. The impeller is located within the blower housing between the upright side walls thereof. One of the side walls has an inlet opening in the lower end thereof. An extension having a passage is secured to the one side wall around the inlet opening. Fastening members, as bolts, secure the extension to the mower deck. An upright forwardly inclined baffle with the extension directs grass clippings into the internal chamber of the housing. The rotating impeller creates a suction or vacuum pressure that draws the grass clippings from under the deck of the mower into the internal chamber, and continuously discharges the grass clippings out of the chamber into the collector means. Grass clippings collector means are mounted on the tractor for receiving the grass clippings. The collector means includes a bag which is removably mounted on a support to facilitate the handling of the collected grass clippings.

The grass collection apparatus includes the blower that is attached directly to the discharge section of the mower deck. The impeller is driven in direct relationship to the speed of the cutting blades of the mower. A separate engine is not used to operate the blower. When the clutch for the mower is disengaged, it automatically disengages the drive to the blower. The cost and maintenance of the apparatus is materially less than the prior art grass collection apparatuses.

DESCRIPTION OF PREFERRED EMBODIMENT

Figure 1:
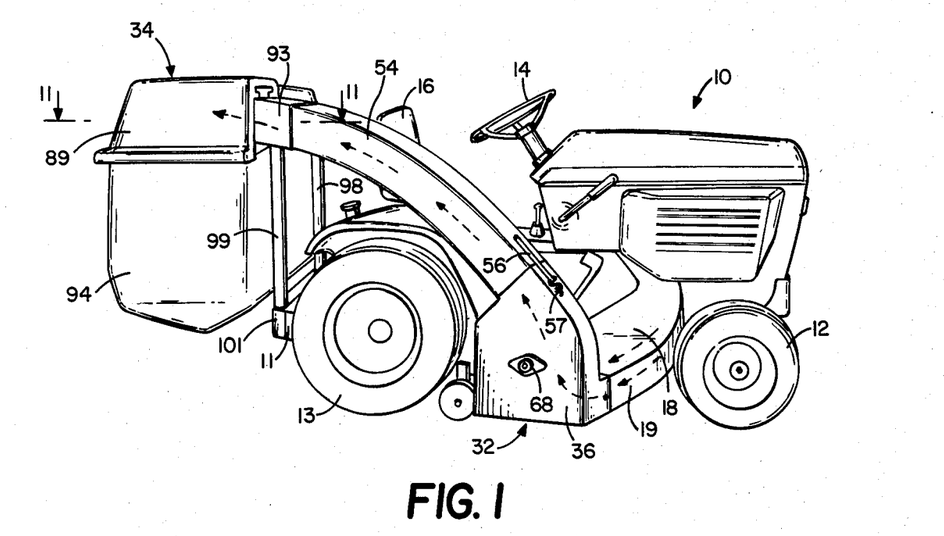
FIG. 1 is a side view of a tractor and rotary lawn mower equipped with a grass collection apparatus of the invention.
Figure 2:
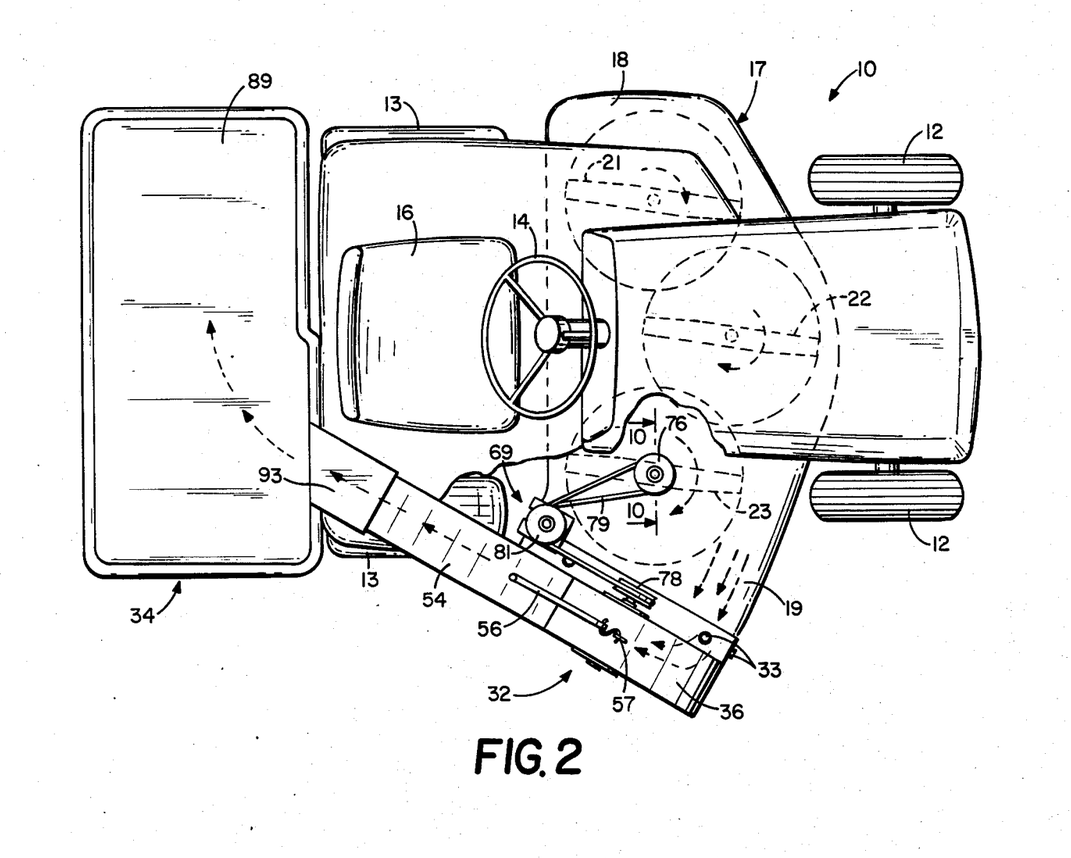
FIG. 2 is a plan view of the rotary lawn mower and grass collector apparatus of FIG. 1.

Referring to FIGS. 1 and 2, there is shown a conventional garden tractor indicated generally at 10. Tractor 10 has a generally horizontal frame 11 supporting front steering wheels 12 and rear drive wheels 13. A steering wheel 14 is located forwardly of the drivers seat 16 to facilitate the operation of the tractor. An internal combustion engine (not shown) functions to drive the rear wheels 13 to move the tractor over the terrain, such as a lawn.

Tractor 10 is equipped with a rotary lawn mower indicated generally at 17. The lawn mower 17 has an inverted panshaped deck 18 located under the frame 11 between the front and rear wheels 12 and 13. Deck 18 has a side discharge section 19. A plurality of cutting blades 21, 22 and 23 are located in the space below deck 18. Blades 21, 22 and 23 are mounted on upright shafts rotatably mounted with bearings (not shown) on deck 18. The shafts for the blades 21, 22 and 23 are drivably connected with an endless belt to the power transmitting structure (not shown) operated by the internal combustion engine. An example of a belt and pulley drive for a plurality of cutting blades on a rotary lawn mower are discharged by Ansbaugh et al in U.S. Pat. No. 4,114,353. The rotary lawn mower including the drive for the rotary cutting blades is conventionally structure and does not form part of the invention.

Figures 3, 4, 9, 10:
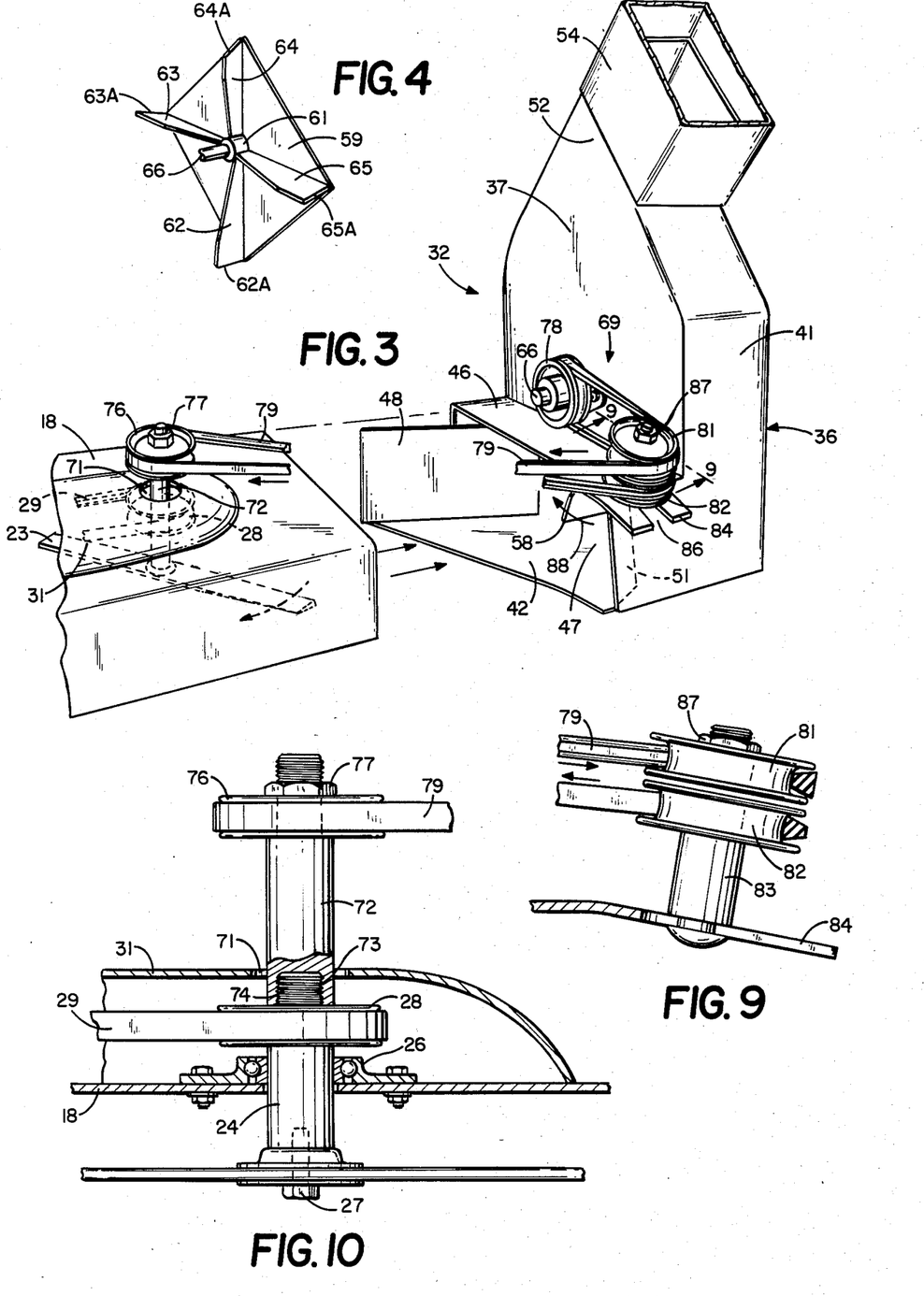
FIG. 3 is an exploded perspective view of the outlet section of the rotary lawn mower and the blower for moving grass clippings into a collection container.
FIG. 4 is a perspective view of the impeller of the blower.
FIG. 9 is an enlarged sectional view taken along the line 9—9 of FIG. 3.
FIG. 10 is an enlarged sectional view taken along the line 10—10 of FIG. 2.

Referring to FIG. 10, upright blade shaft 24 is rotatably mounted on deck 18 with a bearing 26. A bolt 27 clamps blade 23 to the bottom of shaft 24. A pulley 28 accommodating an endless drive belt 29 is attached to the top of shaft 24. Belt 29 is part of the belt and pulley drive of the rotary lawn mower. A cover or shield 31 mounted on top of deck 18 encloses the belt and pulley drive for the upright blade shafts.

Returning to FIGS. 1 and 2, a blower indicated generally at 32 is located adjacent the discharge end of the side discharge section 19 of the deck. A plurality of nut and bolts 33 secure blower 32 to section 19. Blower 32 operates to draw grass clippings, leaves, twigs, and like loose debris, herein called particulate materials, from under deck 18 and discharge the particulate material into a material collector indicated generally at 34. Material collector 34 is mounted on the rear of the frame of the tractor 10 behind seat 16.

Figure 5:
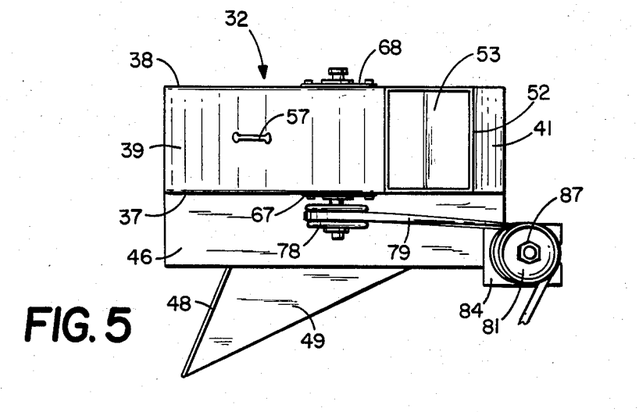
FIG. 5 is a top view of the blower.

Blower 32 includes an upright housing indicated generally at 36 located adjacent the discharge side of deck 18. Housing 36 has a pair of laterally spaced upright side walls 37 and 38 joined to front and rear end walls 39 and 41. A generally flat bottom wall 42 is joined to walls 37, 38, 39, and 41 and provides therewith an interior chamber 43. Side wall 37 has at its lower end a generally rectangular inlet opening 44. The bottom of opening 44 is defined by the flat bottom wall 42. Housing 36 has a lateral inwardly directed extension 46 surrounding the inlet opening 44. Extension 46 is a generally rectangular structure having an inlet passage 47 in communication with inlet opening 44. A flat inwardly directed deflector plate 48 is mounted on extension 46. As shown in FIG. 5, deflector plate 48 extends at an angle in a forward direction from extension 46. The bottom wall 42 has a generally triangular section 49 that is joined to the bottom of deflector plate 48. Deflector plate 48 fits into the deck discharge section 19 and directs the particulate material into the bottom of interior chamber 43. A second deflector plate 51 is located within extension 46 opposite deflector plate 48. Deflector plates 48 and 51 diverge outwardly or into the chamber 43 to direct the particulate material through the inlet opening 44 into the bottom of interior chamber 43.

The top of housing 36 has an upwardly and rearwardly directed discharge chute 52. Chute 52 has a discharge passage aligned with a tube 54 for carrying the particulate material to collector 34. As shown in FIGS. 1 and 3, tube 54 telescopes over chute 52. A flexible cord 56 attached to tube 54 and hooked to a eye member 57 on housing 36 yieldably holds tube 54 on chute 52.

Figure 6:
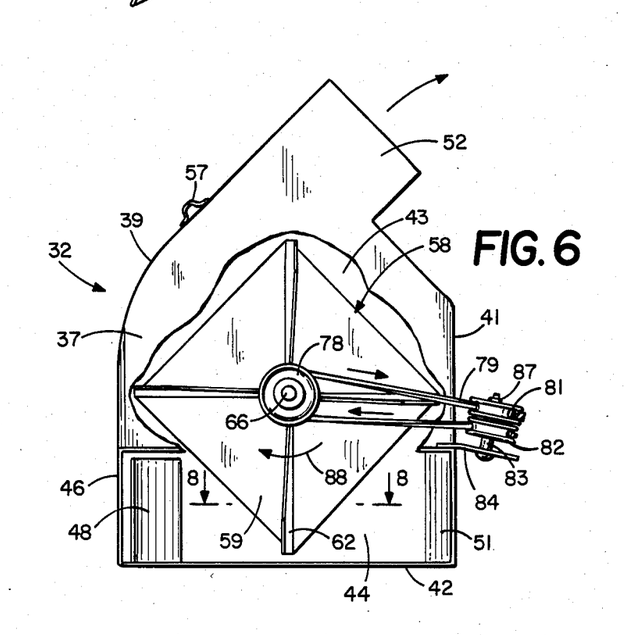
FIG. 6 is an inside elevational view, with parts broken away, of the blower.
Figure 7:
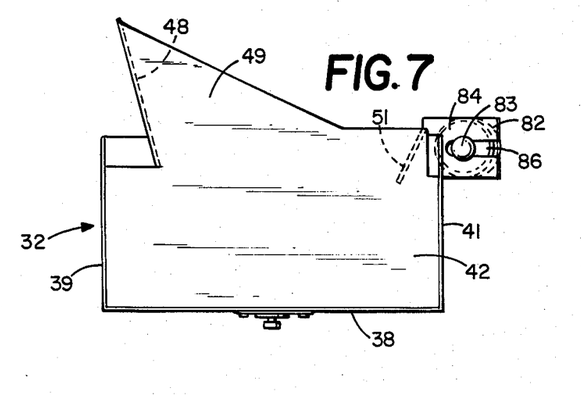
FIG. 7 is a bottom view of the blower.
Figure 8:
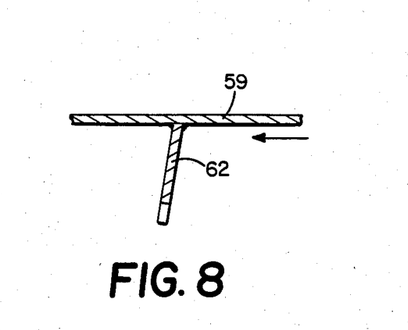
FIG. 8 is an enlarged sectional view taken along the line 8—8 of FIG. 6.

An impeller indicated generally at 58 is rotatably mounted on housing 36 within interior chamber 43. As shown in FIGS. 4 and 6, impeller 58 has a square upright plate 59 located adjacent wall 36. A cylindrical member or hub 61 is secured to the center of plate 59 and accommodates impeller shaft 66. A set screw (not shown) secures hub 61 to shaft 66. A plurality of paddles 62, 63, 64 and 65 extend from hub 61 to the corners of plate 59. Each paddle 62-65 has a short outwardly directed extension for lip 62A, 63A, 64A, and 65 that projects laterally from the corners of plate 59. As shown in FIG. 8, paddle 62 is inclined in a forward direction relative to the plane of plate 59. Each paddle 63, 64, and 65 have a similar forwardly directed incline. The inclined paddles 62, 63, 64 and 65 are directed toward inlet opening 44. The shaft 66 projects through holes in side walls 37 and 38 and is rotatably mounted on bearings 67 and 68 secured to the side walls. Impeller 58 is driven with a belt and pulley power transmission indicated generally at 69 from blade shaft 24. Cover 31 is provided with a hole 71. Hole 71 is located above blade shaft 24. A shaft extension 72 extends upwardly from blade shaft 24 through hole 71. The lower end of shaft extension 72 has a threaded bore 73 to accommodate the threaded upper end 74 of blade shaft 24. The conventional nut is removed from the threaded end 74 and replaced with the shaft extension 72. A first pulley 76 is mounted on the upper end of shaft extension 72. Nut 77 secures pulleys 76 to shaft extension 72. A second pulley 78 is mounted on the inner end of impeller shaft 66.

An endless belt 79, such as a V-belt, is trained about the first and second pulleys 76 and 78 to transmit power from the shaft extension 72 to impeller shaft 66. Belt 79 engages a pair of idler pulleys 81 and 82 rotatably mounted on the top of an incline post 83. Post 83 is mounted on a bracket 84 having a rearwardly directed slot 86. As shown in FIG. 9, bracket 84 extends in a downward and rearward direction inclining post 83 away from second pulley 78. Preferably, post 83 is angularly disposed about 5 degrees from a vertical plane away from pulley 78. Post 83 aligns the outer edges of pulleys 81 and 82 with second pulley 78. A nut 87 on top of post 83 is used to secure the post to bracket 84.

The tension of belt 79 is adjusted by adjusting the position of post 83 on bracket 84. This is accomplished by loosening the nut 87 and moving the post on bracket 84 to apply tension to the belt 79. As shown in FIG. 9, the upper run of belt 81 moves over pulley 81 from the top of the second pulley 79 to the power or drive pulley 76. The lower run of belt 79 extends around pulley 82 to the bottom of the second pulley 78. The belt and pulley power transmission 79 efficiently and effectively transmits power from the vertical blade shaft 24 to the horizontal impeller shaft 66. A shield, now shown, is used to enclose the belt and power transmission 69. The impeller 58 is driven in the direction of the arrow 88 to move air and particulate material from under mower deck 18 and discharge the material via tube 54 into material collector 34. Impeller 58 establishes a vacuum or suction that draws the particulate material into the interior chamber 43. The paddles 62, 63, 64 and 65 move the material through the chamber and discharge the material along with air into the tube 54 leading to collector 34. The rotating impeller 58 also functions as a fly wheel to maintain the speed of rotation of the impeller 58 and rotating blades 21, 22, and 23.

Figure 11:
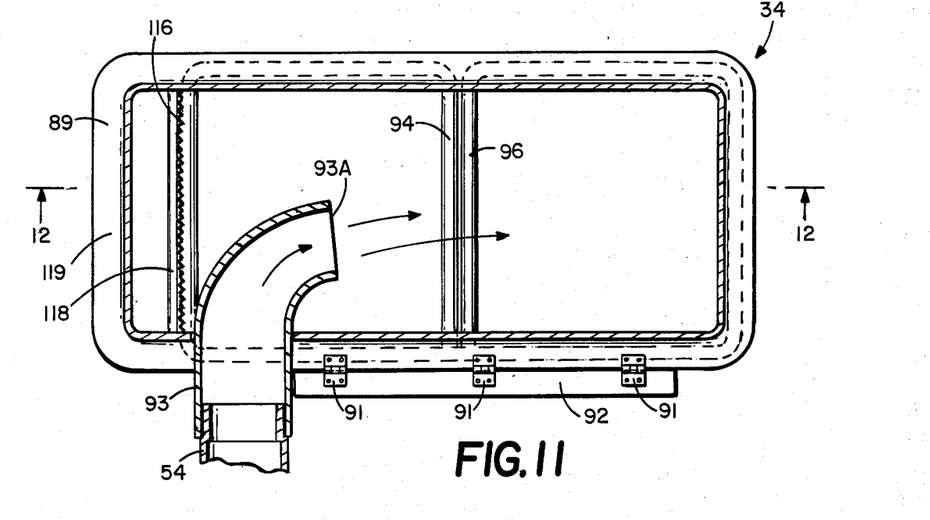
FIG. 11 is an enlarged sectional view taken along the line 11—11 of FIG. 1.

As shown in FIGS. 1, 2 to 11 and 12, collector 34 has an inverted pan-shaped cover 89 pivotally mounted on a transverse frame member 92 with a plurality of hinges 91. Cover 89 can be moved to an upward open position to facilitate the removal of a pair of material containing bags 94 and 96. An elbow 93 extended through an opening in the front side of cover 89 directs material into the downwardly directed bags 94 and 96. Tube 54 telescopes into elbow 93 as shown in FIG. 11. Elbow 93 has a discharge opening 93A directed toward the top of the open bags 94 and 96.

Figure 13:
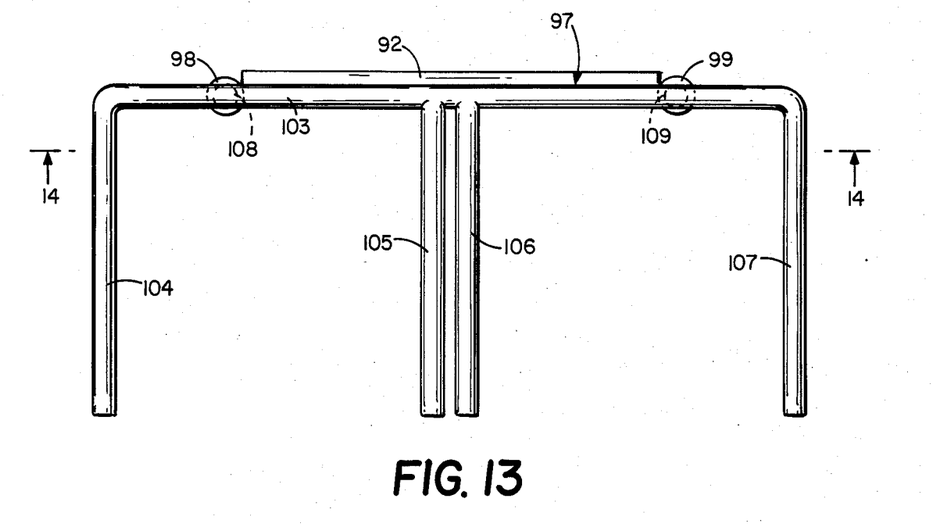
FIG. 13 is a top view of the fork frame for supporting the grass clippings collection bags.
Figure 14:
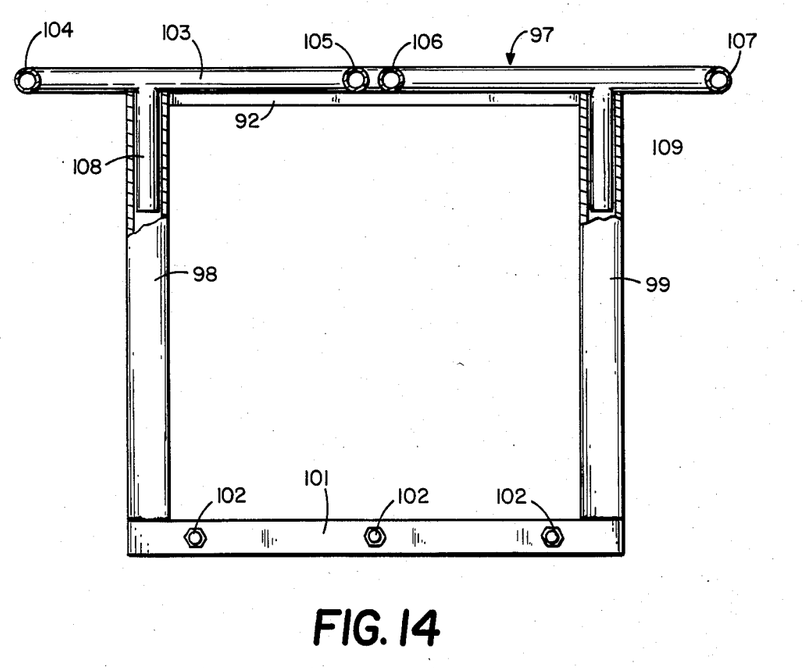
FIG. 14 is a sectional view taken along the line 14—14 of FIG. 13 with parts of the support posts broken away.

The bags 94 and 96 are supported on a fork frame indicated generally at 97, in FIGS. 13 and 14. The fork frame is removably mounted on a pair of upright posts 98 and 99. The posts 98 and 99 are connected to a cross member 101. A plurality of bolts 102 secure the cross member to the frame 11 of tractor 10. The cross member 92 is secured to the top of posts 98 and 99.

As shown in FIGS. 13 and 14, fork member 97 has a cross beam 103 supporting a plurality of rearwardly directed horizontal fingers 104, 105, 106 and 107. Fingers 104-107 are transversely spaced from each other to hold the upper ends of the bags in the open position. A pair of downwardly directed spikes or members 108 and 109 telescope into the open upper ends of the posts 98 and 99 to removably support fork 97 on the post 98 and 99.

Figure 12:
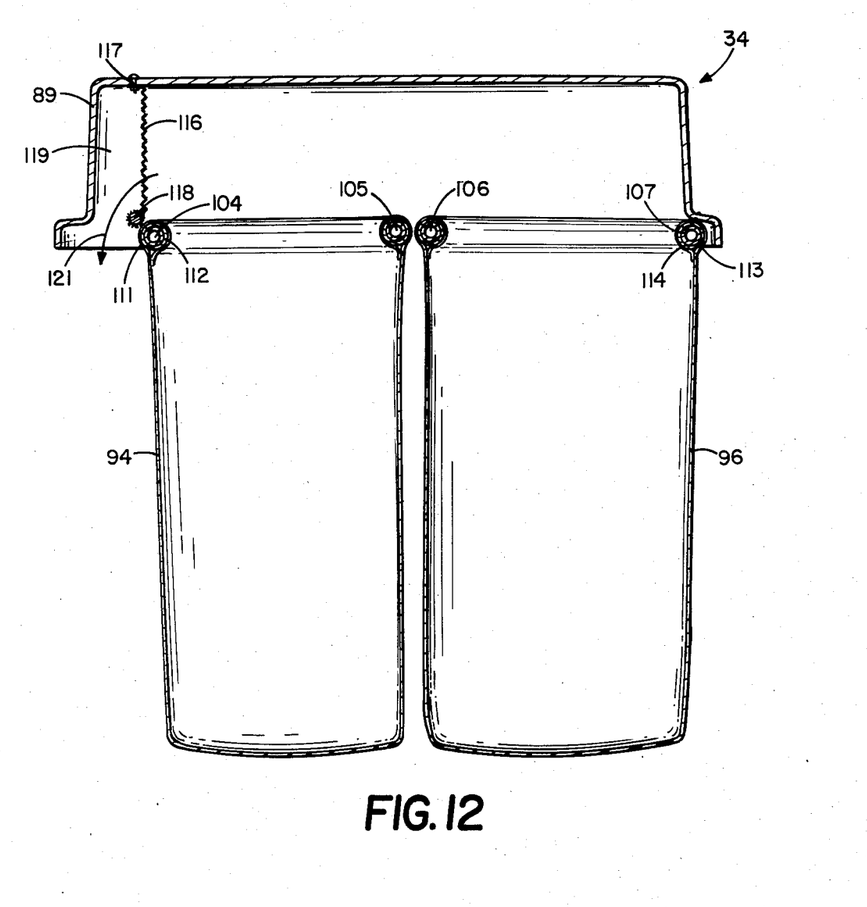
FIG. 12 is a sectional view taken along the line 12—12 of FIG. 11.

As shown in FIG. 12, bag 94 has a top loop 111 accommodating a tube 112. Tube 112 has open ends and is adapted to telescope over the fork fingers 104 and 105 thereby mount bag 94 on the fingers 104 and 105. Bags 96 has a top loop 113 accommodating tube 114. Tube 114 has open ends and is adapted to telescope unto the fork fingers 106 and 107 whereby the bag is removably mounted on the fork fingers 106 and 107.

As shown in FIGS. 11 and 12, cover 89 supports a downwardly directed screen 116. Screen 116 is located above fork member 104 and provides a barrier which allows the air to flow within the cover 89 to the atmosphere and retain the particulate material in bags 94 and 96. Fasteners 117 secure screen 116 to the top of cover 89. The lower portion of screen 116 is attached to a rod 118 extended and secured to the front and rear wall of the cover. Screen 116 is spaced from the end wall of cover 89 providing a space 119 to allow the air to flow from under the cover as indicated by the arrow 121 in FIG. 12.

In use, blower 32 operates concurrently with the rotation of cutting blades 21, 22 and 23. The internal combustion engine of tractor 10 delivers power to the drive shafts for the cutting blades including drive shaft 24. The belt and pulley transmission 69 operates to continuously transmit power from blade shaft 24 to blower shaft 78. The rotating blades 21, 22 and 23 and blower 32 move air through the space under the deck 18 and the blower 32. The grass under the deck 18 is erected by the moving air and cut with the rotating blades 21, 22 and 23. Blower 32 establishes a suction or vaccum which draws the particulate materials under deck 18 into the interior chamber 43 of the blower housing 36. Impeller 58 picks up the material from the lower portion of chamber 43, elevates the material, and discharges the material through spout 52 into the tube 54. Tube 54 carries the material to elbow 93. The elbow 93 discharges and directs the material into the open tops of bags 94 and 96 as shown in FIG. 11.

The belt and pulley power transmission 69 transmits power from the drive horizontal pulley 76 mounted on the upper end of the extension shaft 72 to the driven vertical pulley 78 mounted on the inner end of the impeller shaft 66. The vertical axis of rotation of pulley 76 is at right angles to the horizontal axis of rotation of the impeller 66. Endless belt 79 transmits the power from pulley 76 to the impeller pulley 78. The belt 79 is trained about the inclined idler pulleys 81 and 82. The idler pulleys 81 and 82 mounted on post 83 are located in positions to maintain the alignment of the belt 79 with pulleys 76 and 78. This is achieved by rotatably mounting pulleys 81 and 82 on the upper end of the post 83 on an axis that is inclined away from pulley 78. The pulleys 81 and 82 have cylindrical belt engaging faces that are larger than the width of the belt whereby the belt runs at slight angles relative to the cylindrical surfaces of pulleys 81 and 82. This allows the belt to change elevation as it moves around pulleys 81 and 82.

The particulate material is collected in bags 94 and 96. The material is discharged from elbow 93 into the space under cover 89. The material falls into the open top bags 94 and 96. The air flows through screen 116 adjacent the outside of bag 94. The bags 94 and 96 are releasably retained on the fingers 104, 105, and 106,107. When the bags 94 and 96 are full, cover 89 is pivoted to an open position. The bag 94 and 96 are moved rearwardly off the fingers 104, 105 and 106, 107. The material in the bags 94 and 96 is placed in a disposal area, such as a mulch pile. The empty bags are placed back on fingers 104, 105 and 106,107. The cover 89 is then moved to its closed or down position 89 as shown in FIG. 12. The power to blades 21, 22, and 23 and the blower 32 is disengaged during the emptying of the bags 94 and 96.

While there has been shown and described preferred embodiment of the grass collector apparatus including the blower and belt and power transmission therefor and the grass collector, it is understood that changes in the apparatus may be made by those skilled in the art without departing from the invention. The invention is defined in the following claims.

The embodiments of the invention in which an exclusive property or privilege are claimed are defined as follows:

1. An apparatus for cutting grass and collecting grass clippings comprising: a tractor having an internal combustion engine, a rotary lawn mower having a generally horizontal deck mounted on the tractor, said deck having a grass clipping side discharge section having a discharge opening, a plurality of grass cutting blades located under said deck, means including upright blade shafts rotatably mounting the blades on the deck, drive means for transmitting power from the tractor engine to the blade shafts to rotate the blades whereby the blades cut grass under said deck and move grass clippings through said discharge opening, grass clippings collector means mounted on the tractor, and blower means for receiving grass clippings from said discharge opening and moving the grass clippings to the collector means, said blower means having housing with an internal chamber and an inlet opening aligned with the discharge opening, impeller means located within said chamber, a horizontal shaft rotatably mounting the impeller means on the housing for rotation about a generally horizontal axis, power transmission means drivably connecting the horizontal shaft with one upright blade shaft whereby power is transmitted from said one upright blade shaft to the impeller means to rotate the impeller means, said deck having a hole above said one blade shaft, said power transmission means including an upright shaft extension extended through said hole and secured to said one blade shaft, a generally horizontal first pulley secured to said shaft extension, a generally vertical second pulley secured to said horizontal shaft, an upright post, support means mounting the post on the housing, third and fourth pulleys rotatably mounted on the post for rotation about a common generally upright axis, said third and fourth pulleys having outer belt accommodating portions generally aligned with the plane of rotation of the second pulley, and a single endless belt trained about said first and second pulleys and engageable with said third and fourth pulleys whereby said third and fourth pulleys change the orientation of the belt from horizontal to vertical and back to horizontal as the belt travels about said first and second pulleys whereby said belt transmits power from the first pulley to the second pulley to rotate the impeller means concurrently with the rotation of the blades.

2. The apparatus of claim 1 wherein: said one blade shaft has a threaded upper end, said shaft extension having an upper end and a lower end, a threaded bore in the lower end thereof, said threaded upper end being threaded into said bore to secure the staff extension to said blade shaft, said first pulley being mounted on the upper end of the shaft extension.

3. The apparatus of claim 1 wherein: the support means is inclined downwardly away from the second pulley, said post being mounted on the support means having an axis inclined away from the second pulley, said third and fourth pulleys being rotatable about the inclined axis of the post.

4. The apparatus of claim 3 including: means to adjustably mount the post on the support means for adjusting tension of the belt.

5. The apparatus of claim 3 wherein: said post has a generally upright axis inclined away from the second pulley about 5 degrees from a vertical axis.

6. The apparatus of claim 1 wherein: the housing has a lateral extension with a passage open to the lower portion of the interior chamber, said passage being aligned with the discharge opening whereby said cut grass clippings are drawn into the interior chamber of the housing on rotation of the impeller means.

7. The apparatus of claim 6 including: baffle means located within said lateral extension for directing grass clippings into the interior chamber.

8. The apparatus of claim 1 wherein: the housing has laterally spaced upright side walls, a bottom wall attached to the side walls and end walls joined to the side walls and bottom walls, one of said side walls having the inlet opening, said side walls and end walls having a grass clipping discharge spout extended toward the collector means, a generally rectangular lateral extension secured to said one of said side walls, said extension having a passage aligned with said inlet opening, means mounting said extension on said mower deck.

9. The apparatus of claim 8 including: baffle means located within said extension for directing grass clippings into the interior chamber.

10. The apparatus of claim 1 wherein: the impeller comprises an upright plate mounted on the horizontal shaft, and a plurality of generally radial paddles secured to one side of the plate, said paddles being projected toward the inlet opening of the housing.

11. The apparatus of claim 10 wherein: said plate has a generally square shape having corners, said paddles extended from said horizontal shaft to the corners of the plate, said paddles having ends which project laterally from the corners of said plate.

12. The apparatus of claim 10 wherein: said paddles project away from the one side of the plate at an acute angle in the direction of rotation of the impeller means.

13. An apparatus for use with a rotary lawn mower to collect grass clippings in a collector, said rotary lawn mower having a generally horizontal deck and a grass clipping side discharge section having a discharge opening, a plurality of grass cutting blades located under said deck, means including upright blade shafts rotatably mounting the blades on the deck, drive means for transmitting power from a power source to the blade shafts to rotate the blades whereby the blades cut grass under said deck and move grass clippings through said discharge opening, and a grass clippings collector means comprising: blower means for receiving grass clippings from said discharge opening and moving the grass clippings to the collector means, said blower means having housing with an internal chamber and an inlet opening adapted to be aligned with the discharge opening, impeller means located within said chamber, a horizontal shaft rotatably mounting the impeller means on the housing for rotation about a generally horizontal axis, power transmission means for drivably connecting the horizontal shaft with one upright blade shaft whereby power is transmitted from said one upright blade shaft to the impeller means to rotate the impeller means, said deck having a hole above said one blade shaft, said power transmission means including an upright shaft extension extended through said hole and secured to said one blade shaft, a generally horizontal first pulley secured to said shaft extension, a generally vertical second pulley secured to said horizontal shaft, an upright post, support means mounting the post on the housing, third and fourth pulleys rotatably mounted on the post for rotation about a common generally upright axis, said third and fourth pulleys having outer belt accommodating portions generally aligned with the plane of rotation of the second pulley, and a single endless belt trained about said first and second pulleys and engageable with said third and fourth pulleys whereby said third and fourth pulleys change the orientation of the belt from horizontal to vertical and back to horizontal as the belt travels about said first and second pulleys whereby said belt transmits power from the first pulley to the second pulley to rotate the impeller means concurrently with the rotation of the blades.

14. The apparatus of claim 13 wherein: said one blade shaft has a threaded upper end, said shaft extension having an upper end and a lower end, a threaded bore in the lower end thereof, said threaded upper end being threaded into said bore to secure the staff extension to said blade shaft, said first pulley being mounted on the upper end of the shaft extension.

15. The apparatus of claim 13 wherein: the support means is inclined downwardly away from the second pulley, said post being mounted on the support means having an axis inclined away from the second pulley, said third and forth pulleys being rotatable about the inclined axis of the post.

16. The apparatus of claim 15 including: means to adjustably mount the post on the support means for adjusting tension of the belt.

17. The apparatus of claim 13 wherein: said post has a generally upright axis inclined away from the second pulley about 5 degrees from a vertical axis.

18. The apparatus of claim 13 wherein: the housing has a lateral extension with a passage open to the lower portion of the interior chamber, said passage being aligned with the discharge opening whereby said cut grass clippings are drawn into the interior chamber of the housing on rotation of the impeller means.

19. The apparatus of claim 18 including: baffle means located within said lateral extension for directing grass clippings into the interior chamber.

20. The apparatus of claim 13 wherein: the housing has laterally spaced upright side walls, a bottom wall attached to the side walls and end walls joined to the side walls and bottom wall, one of said side walls having the inlet opening, said side walls and end walls having a grass clipping discharge spout extended toward the collector means, a generally rectangular lateral extension secured to said one of said side walls, said extension having a passage aligned with said inlet opening, means for mounting said extension on said mower deck.

21. The apparatus of claim 20 including: baffle means located within said extension for directing grass clippings into the interior chamber.

22. The apparatus of claim 13 wherein: the impeller comprises an upright plate mounted on the horizontal shaft, and a plurality of generally radial paddles secured to one side of the plate, said paddles being projected toward the inlet opening of the housing.

23. The apparatus of claim 22 wherein: said paddles extended from said horizontal shaft to the corners of the plate, said paddles having ends which project laterally from the corners of said plate.

24. The apparatus of claim 23 wherein: said paddles project away from the one side of the plate at an acute angle in the direction of rotation of the impeller means.

25. An apparatus for use with a rotary lawn mower having a deck for moving grass clippings to a collection container, said lawn mower having at least one rotary grass cutting blade located below said deck, a generally upright first shaft rotatably mounted on the deck and secured to the blade, power means for rotating said first shaft thereby rotating the blade, the said deck having a discharge opening along one side thereof, the improvement of: said deck having an opening above said upright first shaft, housing means adapted to be mounted on the deck adjacent said discharge opening, said housing means having an interior chamber and a lower portion having an inlet opening aligned with the discharge opening, means for securing said lower portion of the housing means to said deck, rotatable impeller means located within said chamber, horizontal shaft means rotatably mounting the impeller means on the housing means, said housing means having an upright discharge opening, means joining the housing means to the material collection container for carrying grass clippings from the discharge opening to the collection container, and drive means connected to said upright first shaft and said shaft means to rotate said impeller means concurrently with the rotation of the blade whereby said blade cuts grass and discharges grass clippings through said discharge opening into the inlet opening, said impeller means moving the grass clippings through the interior chamber and the means for carrying the grass clippings to the container, said drive means including an upright extension shaft extended through said opening in the deck and secured to said first shaft, generally horizontal first pulley means mounted on said extension shaft, generally vertical second pulley means operatively connected to said shaft means, idler pulley means including third and fourth pulley means rotatably mounted for rotation about a common generally upright axis, said idler pulley means having outer belt accommodating portions generally aligned with the plane of rotation of the second pulley means, support means for mounting said idler pulley means in a fixed position relative to said housing, and endless belt means operatively trained over said first, second, third, and fourth pulley means whereby said idler pulley means changes the orientation of the belt from horizontal to vertical and back to horizontal as the belt travels about said first and second pulley means whereby said belt means transmits power from the first pulley means to the second pulley means to rotate the impeller means concurrently with the rotation of the blade.

26. The apparatus of claim 25 wherein: said shaft extension and first shaft have cooperating threads for mounting the shaft extension on the first shaft.

27. The apparatus of claim 25 wherein: the housing means has laterally spaced upright side walls, a bottom wall attached to the side walls and end walls joined to the side walls and bottom wall, one of said side walls having the inlet opening, said side walls and end walls having a grass clipping discharge spout extended toward the collector means, a generally rectangular lateral extension secured to said one of said side walls, said extension having a passage aligned with said inlet opening and means adapted to mount said extension on said mower deck.

28. The apparatus of claim 27 including: baffle means located within said extension for directing grass clippings into the interior chamber.

29. The apparatus of claim 25 wherein: the impeller means includes an upright plate mounted on the horizontal shaft means, and a plurality of generally radial paddles secured to one side of the plate, said paddles being projected toward the inlet opening of the housing means.

30. The apparatus of claim 29 wherein: said plate has a generally square shape having corners, said paddles extended from said horizontal shaft to the corners of the plate, said paddles having ends which project laterally from the corners of said plate.

31. The apparatus of claim 30 wherein: said paddles project away from the one side of the plate at an acute angle in the direction of rotation of the impeller means.

32. The apparatus of claim 25 wherein: said means for carrying material from the discharge opening to the container means comprises an elongated tubular member having a passage for accommodating the material and air directed through the discharge opening by the rotatable impeller means.

33. The apparatus of claim 25 wherein: said idler pulley means includes an upright post and said third and fourth pulley means rotatably mounted on said post, and said support means mounting the post on the housing means.

34. The apparatus of claim 33 wherein: the support means is inclined downwardly away from the second pulley, said post being mounted on the support means having an axis inclined away from the second pulley, said third and fourth pulleys being rotatable about the inclined axis of the post.

35. The apparatus of claim 34 wherein: means to adjustably mount the post on the support means for adjusting the tension of the belt means.

36. The apparatus of claim 34 wherein: said post has a generally upright axis inclined away from the second pulley about 5 degrees from a vertical axis.

37. An apparatus for use with a rotary lawn mower having a deck for moving grass clippings to a collection container, said lawn mower having at least one rotary grass cutting blade located below said deck, a generally upright first shaft rotatably mounted on the deck and secured to the blade, power means for rotating said first shaft thereby rotating the blade, the said deck having a discharge opening along one side thereof, the improvement of: housing means adapted to be mounted on the deck adjacent said discharge opening, said housing means having an interior chamber and a lower portion having an inlet opening aligned with the discharge opening, rotatable impeller means located within said chamber, horizontal shaft means rotatably mounting the impeller means on the housing means, said housing means having an upright discharge opening for directing grass clippings to the collection container, and drive means connected to said upright first shaft and said shaft means to rotate said impeller means concurrently with the rotation of the blade whereby said blade cuts grass and discharges grass clippings through said discharge opening into the inlet opening, said impeller means moving the grass clippings through the interior chamber and the means for carrying the grass clippings to the container, said drive means including generally horizontal first pulley means drivably connected to first shaft, generally vertical second pulley means operatively connected to said shaft means, idler pulley means including third and fourth pulley means rotatably mounted for rotation about a common generally upright axis, said idler pulley means having outer belt accommodating portions generally aligned with the plane of rotation of the second pulley means, support means for mounting said idler pulley means in a fixed position relative to said housing, and endless belt means operatively trained over said first, second, third, and fourth pulley means whereby said idler pulley means changes the orientation of the belt from horizontal to vertical and back to horizontal as the belt travels about said first and second pulley means whereby said belt means transmits power from the first pulley means to the second pulley means to rotate the impeller means concurrently with the rotation of the blade.

38. The apparatus of claim 37 wherein: the housing means has laterally spaced upright side walls, a bottom wall attached to the side walls and end walls joined to the side walls and bottom wall, one of said side walls having the inlet opening, said side walls and end walls having a grass clipping discharge spout extended toward the collector means, a generally rectangular lateral extension secured to said one of said side walls, said extension having a passage aligned with said inlet opening.

39. The apparatus of claim 38 including: baffle means located within said extension for directing grass clippings into the interior chamber.

40. The apparatus of claim 37 wherein: the impeller comprises an upright plate mounted on the horizontal shaft means, and a plurality of generally radial paddles secured to one side of the plate, said paddles being projected toward the inlet opening of the housing.

41. The apparatus of claim 40 wherein: said plate has a generally square shape having corners, said paddles extended from said horizontal shaft to the corners of the plate, said paddles having ends which project laterally from the corners of said plate.

42. The apparatus of claim 40 wherein: said paddles project away from the one side of the plate at an acute angle in the direction of rotation of the impeller means.

43. The apparatus of claim 37 wherein: said idler pulley means includes an upright post and said third and fourth pulley means rotatably mounted on said post, and said support means mounting the post on the housing.

44. The apparatus of claim 43 wherein: the support means is inclined downwardly away from the second pulley, said post being mounted on the support means having an axis inclined away from the second pulley, said third and fourth pulleys being rotatable about the inclined axis of the post.

45. The apparatus of claim 44 including: means to adjustably mount the post on the support means for adjusting the tension of the belt means.

46. The apparatus of claim 45 wherein: said post has a generally upright axis inclined away from the second pulley about 5 degrees from a vertical axis.

* * * * *